(12) United States Patent
Rankin

(10) Patent No.: US 11,989,320 B2
(45) Date of Patent: May 21, 2024

(54) HIDDEN ELECTRONIC FILE SYSTEM WITHIN NON-HIDDEN ELECTRONIC FILE SYSTEM

(71) Applicant: Rankin Labs, LLC, Williamsport, OH (US)

(72) Inventor: John Rankin, Williamsport, OH (US)

(73) Assignee: Rankin Labs, LLC, Williamsport, OH (US)

( * ) Notice: Subject to any disclaimer, the term of this patent is extended or adjusted under 35 U.S.C. 154(b) by 787 days.

(21) Appl. No.: 17/156,946

(22) Filed: Jan. 25, 2021

(65) Prior Publication Data

US 2021/0256155 A1 Aug. 19, 2021

Related U.S. Application Data

(63) Continuation-in-part of application No. 16/720,222, filed on Dec. 19, 2019, now Pat. No. 10,903,977.

(60) Provisional application No. 62/781,837, filed on Dec. 19, 2018.

(51) Int. Cl.
| | |
|---|---|
| *G06F 21/62* | (2013.01) |
| *G06F 16/11* | (2019.01) |
| *G06F 16/185* | (2019.01) |
| *G06F 21/60* | (2013.01) |
| *H04L 9/08* | (2006.01) |

(52) U.S. Cl.
CPC ........ *G06F 21/6245* (2013.01); *G06F 16/122* (2019.01); *G06F 16/185* (2019.01); *G06F 21/602* (2013.01); *H04L 9/0863* (2013.01); *H04L 9/0869* (2013.01)

(58) Field of Classification Search
None
See application file for complete search history.

(56) References Cited

U.S. PATENT DOCUMENTS

| | | |
|---|---|---|
| 3,688,090 A | 8/1972 | Rankin |
| 4,493,027 A | 1/1985 | Katz et al. |
| 6,023,724 A | 2/2000 | Bhatia et al. |
| 6,567,416 B1 | 5/2003 | Chuah |
| 6,714,985 B1 | 3/2004 | Malagrino et al. |
| 6,757,248 B1 | 6/2004 | Li et al. |

(Continued)

OTHER PUBLICATIONS

Mistree, B., PingFS, https://bmistree.com/pingfs/, pp. 1-27, Dec. 5, 2019.

(Continued)

*Primary Examiner* — Joseph P Hirl
*Assistant Examiner* — Hassan Saadoun
(74) *Attorney, Agent, or Firm* — Standley Law Group LLP; Jeffrey S. Standley; Adam J. Smith

(57) ABSTRACT

Systems and method for creating a hidden electronic file system within a non-hidden electronic file system are provided. Files within a non-hidden electronic file system are pre-allocated and populated with a number of payload blocks, a first portion of which include user data to be covertly stored, a second portion of which include directory information pointing to first portion of payload blocks, and a third portion of which is configured for use as free and available space for new or replacement data. Each of a number of cipher blocks comprise random numbers to be used as a cipher for a corresponding one of the number of payload blocks. Each of the payload blocks is encrypted by an associated one of the cipher blocks.

20 Claims, 3 Drawing Sheets

(56) References Cited

U.S. PATENT DOCUMENTS

| | | | |
|---|---|---|---|
| 7,103,025 B1 | 9/2006 | Choksi | |
| 8,090,866 B1 | 1/2012 | Bashyam et al. | |
| 8,374,091 B2 | 2/2013 | Chiang | |
| 8,397,151 B2 | 3/2013 | Salgado et al. | |
| 9,350,663 B2 | 5/2016 | Rankin | |
| 10,929,556 B1* | 2/2021 | Kurian | G06F 3/0623 |
| 2001/0017844 A1 | 8/2001 | Mangin | |
| 2001/0019614 A1* | 9/2001 | Madoukh | H04L 9/16 |
| | | | 707/999.009 |
| 2002/0041592 A1 | 4/2002 | Van Der Zee et al. | |
| 2002/0054570 A1 | 5/2002 | Takeda | |
| 2002/0071436 A1 | 6/2002 | Border et al. | |
| 2002/0114341 A1 | 8/2002 | Sutherland et al. | |
| 2002/0164024 A1 | 11/2002 | Arakawa et al. | |
| 2003/0031198 A1 | 2/2003 | Currivan et al. | |
| 2003/0056009 A1 | 3/2003 | Mizrachi et al. | |
| 2004/0210763 A1 | 10/2004 | Jonas | |
| 2005/0058129 A1 | 3/2005 | Jones et al. | |
| 2005/0060538 A1 | 3/2005 | Beverly | |
| 2005/0105506 A1 | 5/2005 | Birdwell et al. | |
| 2005/0286517 A1 | 12/2005 | Babbar et al. | |
| 2006/0002681 A1 | 1/2006 | Spilo et al. | |
| 2006/0034317 A1 | 2/2006 | Hong et al. | |
| 2006/0133364 A1 | 6/2006 | Venkatsubra | |
| 2006/0136690 A1* | 6/2006 | Hsieh | G06F 21/6227 |
| | | | 711/164 |
| 2006/0259587 A1* | 11/2006 | Ackerman | G06Q 20/3678 |
| | | | 709/219 |
| 2007/0025388 A1 | 2/2007 | Abhishek et al. | |
| 2007/0028121 A1* | 2/2007 | Hsieh | G06F 21/80 |
| | | | 713/193 |
| 2007/0112714 A1 | 5/2007 | Fairweather | |
| 2007/0223395 A1 | 9/2007 | Lee et al. | |
| 2008/0104313 A1 | 5/2008 | Chu | |
| 2010/0002868 A1* | 1/2010 | Willoughby | H04L 63/0435 |
| | | | 380/255 |
| 2010/0103830 A1 | 4/2010 | Salgado et al. | |
| 2010/0281257 A1 | 11/2010 | Yamazaki et al. | |
| 2011/0085662 A1* | 4/2011 | Myers | H03K 19/17768 |
| | | | 380/252 |
| 2011/0149891 A1 | 6/2011 | Ramakrishna | |
| 2011/0231564 A1 | 9/2011 | Korsunsky et al. | |
| 2012/0117376 A1 | 5/2012 | Fink et al. | |
| 2012/0243539 A1 | 9/2012 | Keesara | |
| 2012/0289250 A1 | 11/2012 | Fix et al. | |
| 2012/0300648 A1 | 11/2012 | Yang | |
| 2012/0307678 A1 | 12/2012 | Gerber et al. | |
| 2013/0028121 A1 | 1/2013 | Rajapakse | |
| 2013/0058231 A1 | 3/2013 | Paddon et al. | |
| 2013/0091102 A1* | 4/2013 | Nayak | G06F 3/067 |
| | | | 707/E17.044 |
| 2013/0343377 A1 | 12/2013 | Stroud et al. | |
| 2014/0100014 A1 | 4/2014 | Bennett, III et al. | |
| 2014/0254598 A1 | 9/2014 | Jha et al. | |
| 2014/0294019 A1 | 10/2014 | Quan et al. | |
| 2015/0100613 A1 | 4/2015 | Osiecki et al. | |
| 2015/0229714 A1 | 8/2015 | Venkatsubra et al. | |
| 2016/0269294 A1 | 9/2016 | Rankin | |
| 2017/0010900 A1 | 1/2017 | Cobb | |
| 2017/0041296 A1 | 2/2017 | Ford et al. | |
| 2017/0090872 A1 | 3/2017 | Mathew et al. | |
| 2017/0351575 A1 | 12/2017 | Baker et al. | |
| 2018/0018147 A1 | 1/2018 | Sugawara | |
| 2018/0060244 A1 | 3/2018 | Godard et al. | |
| 2018/0102975 A1 | 4/2018 | Rankin | |

OTHER PUBLICATIONS

Information Sciences Institute, University of Southern California, RFC 791, Internet Protocol, DARPA Internet Program Protocol Specification, Sep. 1981.

Postel, J., RFC 792, Internet Control Message Protocol, DARPA Internet Program Protocol Specification, Sep. 1981.

Information Sciences Institute, University of Southern California, RFC 793, Transmission Control Protocol, DARPA Internet Program Protocol Specification, Sep. 1981.

McCann, J. et al., RFC 1981, Path MTU Discovery for IP version 6, Aug. 1996.

Mathis, M. et al., TCP Selective Acknowledgment Options, Oct. 1996.

Montenegro, G. et al., RFC 4944, Transmission of IPV6 Packets over IEEE 802.15.4 Networks, Sep. 2007.

Paxson et al., RFC 2330, Framework for IP Performance Metrics, May 1998.

Thubert, P. et al., LLN Fragment Forwarding and Recovery draft-thubert-6lo-forwarding-fragments-02, Nov. 25, 2014.

Li, T. et al., A New MAC Scheme for Very High-Speed WLANs, Proceedings of the 2006 International Symposium on a World of Wireless, Mobile and Multimedia Networks, 2006.

Rabah, K., Steganography—The Art of Hiding Data, Information Technology Journal, 2004, pp. 245-269.

Arkin, O., ICMP Usage in Scanning, The Complete Know-How, Jun. 2001.

Brown, J. et al., ARP Coaching Poisoning and Routing Loops in ad Hoc Networks, Mobile Networks and Applications, pp. 1306-1317, 2018.

Hansen, R. et al., Covert6: A Tool to Corroborate the Existence of IPV6 Covert Channels, Annual ADFSL Conference on Digital Forensics, Security Law, 2016.

Mileva, A. et al., Covert Channels in TCP/IP Protocol Stack—extended version—, Central European Journal of Computer Science, 2000.

York, D., Flooding Attack, Science Direct, 2021.

* cited by examiner

HIDDEN ELECTRONIC FILE SYSTEM WITHIN NON-HIDDEN ELECTRONIC FILE SYSTEM

CROSS-REFERENCE TO RELATED APPLICATIONS

This application is a continuation-in-part of U.S. application Ser. No. 16/720,222 filed Dec. 19, 2019, which claims the benefit of U.S. Provisional Application Ser. No. 62/781,837 filed Dec. 19, 2018, the disclosures of which are hereby incorporated by reference as if fully restated.

TECHNICAL FIELD

Exemplary embodiments of the present invention relate generally to systems and methods for creating and managing hidden electronic file systems within non-hidden electronic file systems.

BACKGROUND AND SUMMARY OF THE INVENTION

File systems for managing machine readable information have been available for use since the inception of the modern computer industry. As far back as the 1950's, direct access storage devices (DASD) have been used to retain long term information; furthermore, files of information have been organized within these DASD to hold records of data.

Early adopters of DASD organized data files into adjacent sections of the devices, so that files could be processed in sequence. The existence and location of these files was recorded in a volume table of contents (VTOC) which could be located through repeatable means. This form of file system was reasonably sufficient for a number of decades, until the development of smaller systems, such as PDP-11s running UNIX, or the MP3000 running MPE.

These smaller systems had less available storage capacity and therefore were forced to develop a more space conscious system for file management. Space conscious file systems organized their files using a fluid directory structure that allowed for the location of the file to be discontinuous. By scattering the location of the file, the system was able to maximize the use of available storage by avoiding unnecessary empty space reserves.

Furthermore, these more space conscious file systems also gained an advantage by allowing a more flexible file naming process.

By allowing more flexible file naming, more complicated directory structures like folders and groups could be created. While the older, more VTOC oriented file systems were limited on dynamic expansion, these new structures allowed for dynamic creation renaming, and deletion of file entries.

These newer, more dynamic file systems have been adopted by more compact platforms like small systems and portables. The older more rigid style of file systems can still be found in use within large mainframe platforms. While there are still a wide number of reasons to adopt the more dynamic style, the rigid form allows for far greater control and recovery over the information.

While these two forms of file systems have various advantages and disadvantages, there are a number of elements such systems have in common. For example, data is stored in a semi-permanent fashion through a process of continual update. If there is a power loss to the computer involved the information in the storage system will not be lost and the file system will be again available once normal operations have recovered. The existence of data files is obvious and can be determined through an examination of the storage medium. While the data within the file might be encrypted, the existence of the file is not in question. Directory information may be duplicated in memory. However, a current and updated version of the directory must exist on the storage device. The purpose of the memory duplication is often solely for access efficiency. Furthermore, memory caches can be partial or complete in their representations. Finally, the existence of free space is obvious and can be determined through an examination of the storage medium. Since a file system can contain protected or encrypted files and/or directories, the determination of free space will clearly identify sections of the storage device that contain information.

In view of these, and other, shortcomings, what is needed is a system and method for creating and managing a hidden electronic file system. The present invention is a system and method for creating and managing a hidden electronic file system.

In exemplary embodiments, information is structured into segments, also referred to herein as blocks, and a random cipher is utilized to create a hidden file system. The file system may be partially or completely hidden. Features of the hidden file system may include the inability to determine the existence or location of files, data, directory structures, or free space. Files and directories may be only exposed to availability when a proper sequence of one or more passwords are applied. Without the proper application of passwords, files and/or directories may remain undetectable, and the number of usable passwords may not be readily determined.

In exemplary embodiments, all data, whether organized into blocks or not, may be stored on a disk, other electronic storage device, or on the DASD in an encrypted format. Furthermore, the encryption method used may be a random cipher, such as, but not limited to the Random Block Security (RBS) described in US Pub. Nos. 2019/0227772 published Jul. 25, 2019, 2019/0238315 published Aug. 1, 2019, and 2019/0265951 published Aug. 29, 2019, the disclosures of each of which are hereby incorporated by reference as if fully restated. This encryption process may obscure the file system and its contents. By using a random cipher, the data may be secured.

The systems and methods described herein may act to effectively prevent the ability to distinguish between free blocks, blocks comprising data, and blocks comprising directory structures without the use of a proper password(s).

In exemplary embodiments, multiple passwords may be utilized to permit different segments of data to be selectively exposed. Different password levels may be defined which permit the selective exposure of files in a layered approach. Without the appropriate application of passwords, all the files may remain unknown. For example, when two passwords are defined, the entry of a first password may expose a first number of files, but only the application of the second password in the correct sequence will expose all files. This is merely exemplary, any number of passwords in any number of layers is contemplated.

In exemplary embodiments, an entire directory structure may be obscured by the absence of the proper sequence of passwords. When files have not been exposed due to a failure to apply a password, there may be no ability to determine if these files exist or not; therefore, the unexposed files remain effectively invisible. It is possible, under duress, to be forced to enter a password for the file system, and therefore, expose some files and some directories; however, there is no effective way to determine if there are further passwords that should be applied and therefore it is difficult to be forced to expose what cannot be observed.

In exemplary embodiments, when power has been removed from the computer system involved, the repository that remains on the storage device is undecipherable. No files, directories, or even free space may be determined due to the random cipher and structural layout. Furthermore, there is no effective way to determine how many layers of password protection exist; therefore, if one or more passwords are provided, there is no effective way to determine if there are more levels and more files and directories to expose.

Normal, visible file systems comprise data stored on an electronic device and organized into data blocks. Within this normal system there may be a directory structure that clearly identifies which blocks are associated with allocated files, and which blocks are free for use in new file allocations. When a file is deleted, or modified in certain ways, some blocks may be released to the pool of available free blocks to be reused for additional allocations. One or more files within such a system may be pre-allocated by populating such files with a predetermined content to fill one or more blocks of the non-hidden file system. Thus, the file is maintained within the visible structure, while its contents may be used or reused by some other method. For example, without limitation, ten megabytes worth of random numbers may be populated into a visible file, and the directory of the non-hidden file system will indicate that there is a file that is ten megabytes in size that exists within the non-hidden file system. This ten-megabyte file may be manipulated by other facilities, without effecting its position within the visible file system.

The present disclosures include systems and methods for creating a hidden file system that is contained within structures for a non-hidden filing system. Rather than storing the structure of the hidden system within data blocks of one or more electronic devices, these underlying structures may be contained within pre-allocated files of a non-hidden (e.g., visible and/or standard) file system. Furthermore, the interleaving of these pre-allocated files may further augment the location, dimensions, and extent of the hidden file system contained within a non-hidden system. These systems and methods may create a hidden file system within a standard file system that would require knowledge of the passwords, hierarchical layer of the passwords, as well as the file within the standard system that acts as the root for the hidden file system to access the hidden file system within the non-hidden file system.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF THE INVENTION

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Embodiments of the invention are described herein with reference to illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Figure 1:
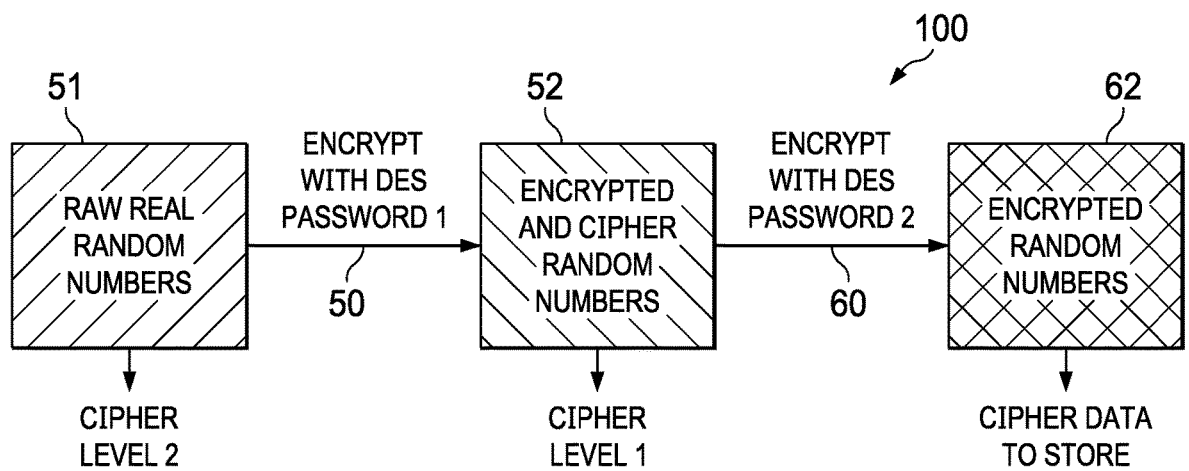
FIG. 1 is a simplified block diagram illustrating an exemplary cipher security scheme in accordance with the present invention.
Figure 2:
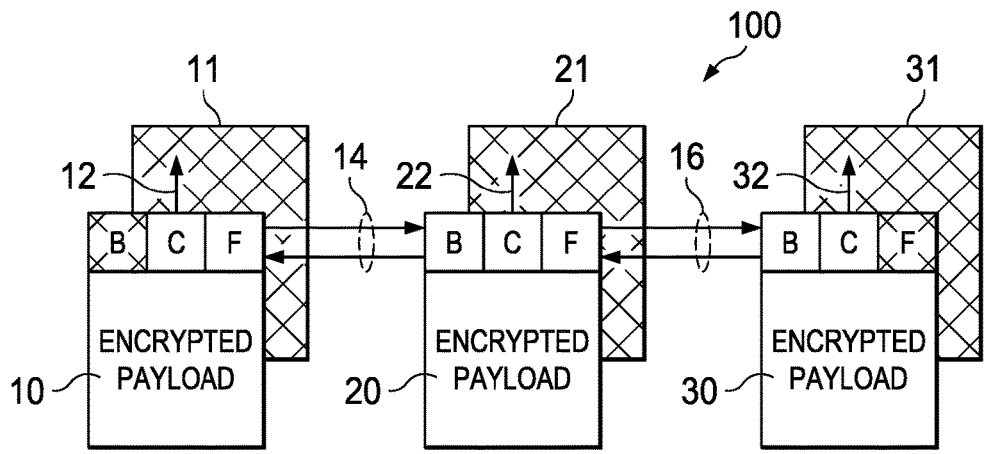
FIG. 2 is a simplified block diagram illustrating an exemplary underlining data structure of the system of FIG. 1.

FIG. 1 illustrates an exemplary security system 100 in accordance with the present invention and FIG. 2 provides a more detailed view of the system 100. In order for a file system to be rendered effectively hidden on an electronic storage device, such as but not limited to disk storage, there are several elements that may be managed and maintained as further outlined and described herein.

Cipher Encryption.

In exemplary embodiments, all stored data remains encrypted with a random cipher. Such encryption may be provided at all times when no password has been received and successfully verified. For each data storage block 10, 20, and 30 comprising data (hereinafter also a "payload block") a block of random numbers of equal size 11, 21, and 31 (hereinafter also a "cipher block") may be provided. However, it is contemplated that the cipher blocks 11, 21, and 31 may be of different size than the payload blocks 10, 20, and 30. An exemplary arrangement of such is shown in FIG. 2. However, any number of payload blocks 10, 20, and 30 or any size and corresponding cipher blocks 11, 21, and 31 are contemplated. The payload blocks 10, 20, and 30 may be of the same or different size from one another. Correspondingly, the cipher blocks 11, 21, and 31 may be of the same or different size from one another.

As indicated in FIG. 1, each byte of data within the file structure may be randomly altered using random numbers as indicated generally at items 50 and 60. In exemplary embodiments, truly random numbers, rather than pseudo random numbers, are used. Pseudo random numbers have a computer algorithm as production technique and thus are vulnerable to mathematical observation. However, truly random numbers are unpredictable and when used as a cipher, produce enhanced encryption. The random numbers may be derived utilizing those systems and methods described in, for example without limitation, US Pub. Nos. 2019/0227772 published Jul. 25, 2019, 2019/0238315 published Aug. 1, 2019, and 2019/0265951 published Aug. 29, 2019, each of which are hereby incorporated by reference as if fully restated.

As each payload block 10, 20, and 30 within the system 100 may comprise a cipher block comprising a random block of number of equal size 11, 21, and 31, it may be advantageous to further encrypt this cipher information as indicated generally at item 60 of FIG. 1, though such is not required. Any sufficiently secure method of encryption can be used, such as but not limited to, Data Encryption Standard ("DES"). The DES routines with 128-256 bit encryption, for example without limitation, may produce a sufficiently complex result. Furthermore, when random numbers are used as the input to a standard encryption method like DES, the resulting encrypted block of numbers may still be random. Therefore, it is possible to create a series of blocks of random ciphers by encrypting the original block (item 50) and subsequently encrypting the result (item 60). As illustrated in FIG. 1, two blocks of random ciphers 52 and 62 may be produced by encrypting a block of random numbers 51 twice (at items 50 and 60). Furthermore, the result may include two independent cipher keys available through the sequential application of one of two passwords, for example without limitation. Any number and type of passwords is contemplated.

Underlying Data Structure.

The underlying data structure may identify each payload block 10, 20, and 30 or element used to contain the file system 100. In exemplary embodiments, the structure may only be used as part of the system which can be identified without decryption. Each payload block 10, 20, and 30 may be chained together using exposed pointers 14 and 16, or by locating the payload blocks 10, 20, and 30 in a contiguous sequence, but no further information about the payload blocks 10, 20, and 30 containing an encrypted payload may be identified, as illustrated in FIG. 2. Furthermore, a pointer 16, 18, and 20 to the respective cipher block 11, 21, and 31 containing cipher information may also be permitted. There may be a cipher block of random numbers of equal size 11, 21, and 31 to any encrypted payload block 10, 20, and 30. Furthermore, since the cipher data itself is encrypted, it is acceptable in exemplary embodiments to reveal a pointer 12, 22, and 32 identifying the location of the cipher information 11, 21, and 31, as illustrated by FIG. 2. In other exemplary embodiments, greater security may be obtained by further obfuscating the location of the cipher data 11, 21, and 31. However, enhanced security may alternatively, or additionally, be achieved through use of a two-layered approach to mapping the payload blocks 10, 20, and 30 to cipher blocks 11, 21, and 31. In other words, the first or nth block in the system may comprise an encrypted map of cipher blocks 11, 21, and 31 to payload blocks 10, 20, and 30 that is itself encrypted with random numbers. However, this level of security is unnecessary in exemplary embodiments given the high level of encryption security provided by cipher blocks 11, 21, and 31 for the payload blocks 10, 20, and 30.

Figure 4:
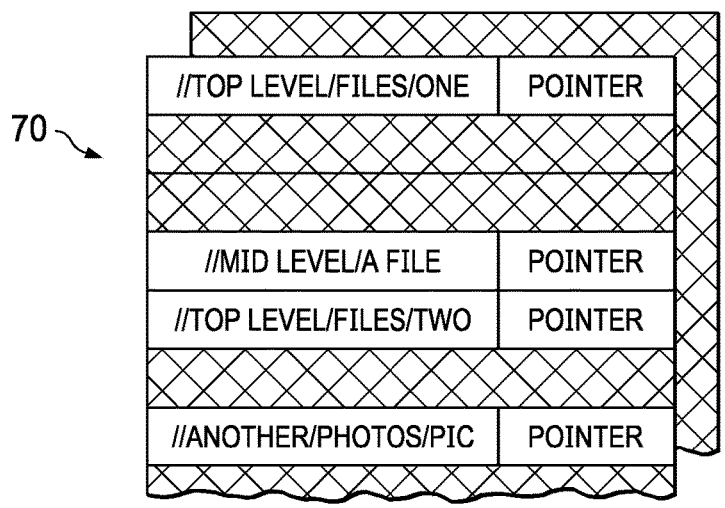
FIG. 4 is a simplified block diagram illustrating an exemplary directory structure for the system of FIG. 1.
Figure 3:
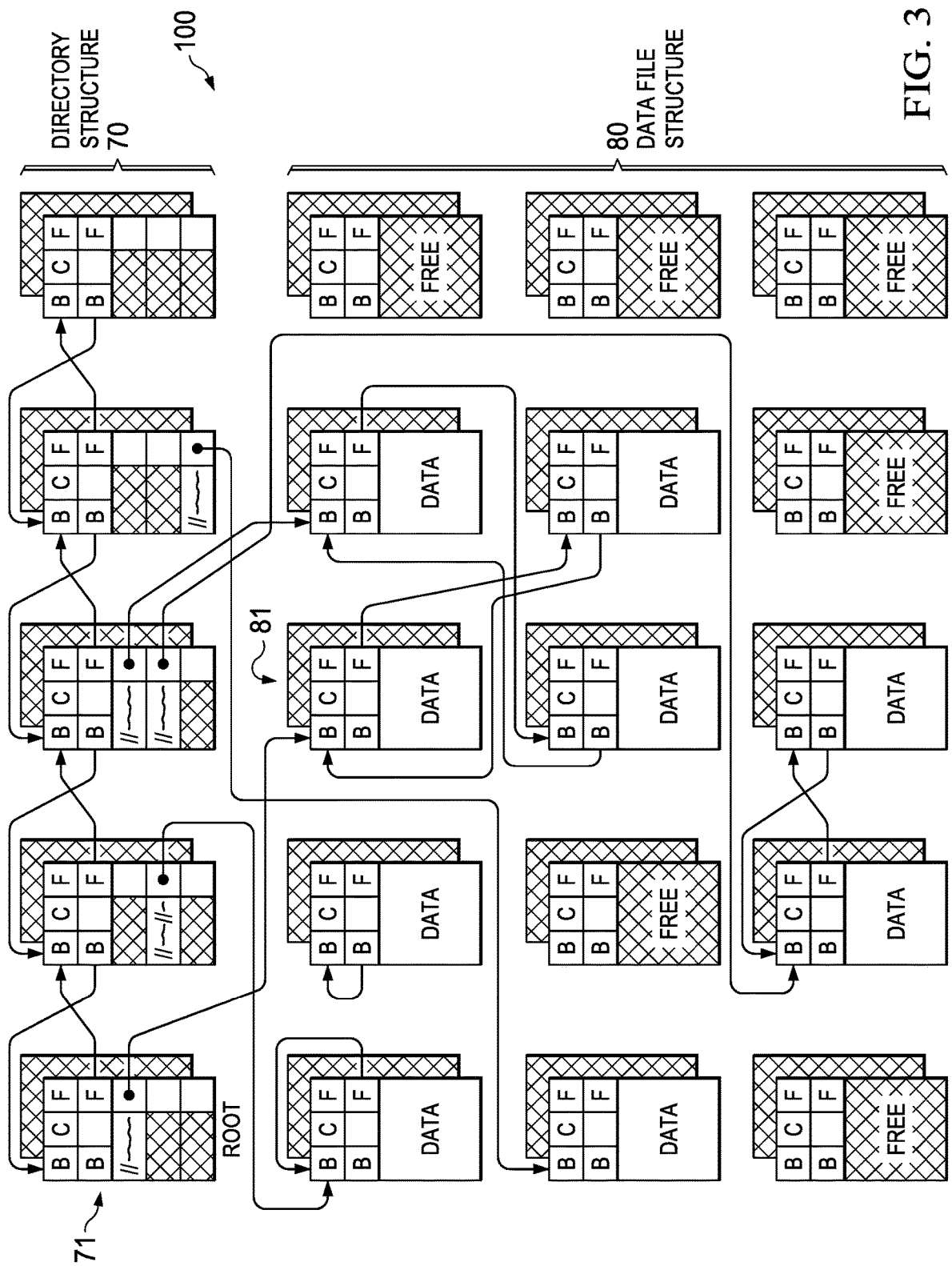
FIG. 3 is a simplified block diagram illustrating an exemplary surface level data structure of the system of FIG. 1.

FIG. 3 and FIG. 4 illustrate an exemplary directory structure 70 for use with the system 100. In order to maintain a hidden file system, directory information may not reflect the structure of the file locations in any permanent or readily discernable way. The directory structure 70 may comprise one or more data blocks 71 comprising directory or file name and structure information (hereinafter also "directory blocks"). This may stand in contrast to the data file structure 80 portion of the system 100 which may comprise the payload blocks 10, 20, and 30 comprising the underlying user data to be stored in a hidden manner. The directory blocks 71 may be read into memory before the directory structure 70 can be fully developed, as illustrated by FIG. 4. This may allow for flexibility such that no disk-based observation of the real structure of the file system 100 may be readily made. The memory-based index may be built dynamically when the directory records are read and processed.

As the directory blocks 71, like other payload blocks 10, 20, and 30, may be encrypted using the shadow cipher blocks 11, 21, and 31, the cipher blocks 11, 21, or 31 may have one or more levels of passwords in their encryption and directory structure 70 entries may be associated with any level of encryption that the user desires. In other words, only directory blocks 71 decryptable by a particular password may be used when building the memory index, for example without limitation. When a second password is applied, for example without limitation, more file directory entries may be exposed and added to the memory index.

So long as no structure of the underlying file system is reflected in the storage layout, it is not effectively possible to determine if there are more encrypted files. Furthermore, as directory entries may contain the dynamic structure of the file system, the presence or appearance of all files and folders may be completely or partially controlled by the application of cipher passwords.

It is notable that the pointers indicating the relationship between the blocks 71 of the directory structure 70 and the data file structure 80 are merely exemplary and are not intended to be limiting.

Data File Structure 80.

The payload blocks 10, 20, and 30 comprising the user data may be generally referred to as the data file structure 80. Once it is clear that directory information is only held in memory, the location of data files or other usable information may only be effectively determined from the memory directory. As in other sections of the file system, all blocks may contain a shadow cipher block 11, 21, and 31 of random numbers of equal size in data length. The first block 71 or section of the directory structure 70 may be pointed to a payload block 81 of the data file structure 80 comprising directory information, as illustrated by FIG. 3, though other arrangements may be provided. As such, it is not effectively possible to determine which blocks in the file system are related to file data structure 80 without the root directory pointer 71.

Free Space.

In exemplary embodiments, there is little to no free space chain or indicator available within the data stored on an electronic storage device. Therefore, the operating file system may build a map of free space in memory by examining the revealed directory and file structure. Once a complete free space map has been developed, it may be possible to allocate and mange new, renamed, or deleted files. Since there is no distinction between file space, directory space, and free space, no inferences can be drawn concerning what may or may not remain hidden within the system 100. Only when the proper passwords have been presented and the parts of the file system in use have been exposed is it possible to accurately determine what is free and available, see e.g., FIG. 3.

In exemplary embodiments, a hidden electronic file system on one or more electronic storage devices comprises a number of payload blocks, each comprising data to be hidden, and a number of cipher blocks, each comprising random numbers to be used as a cipher for a corresponding one of the number of payload blocks. At least one of said payload blocks may comprise user data to be stored. At least one of said payload blocks may comprise directory information pointing to each of the at least one of said payload blocks. All unused payload blocks may be usable as free and available blocks for new and/or replacement data. All payload blocks may be encrypted by their associated cipher block of random numbers. All cipher blocks may be encrypted by an encryption method that uses a password oriented algorithm.

The number of cipher blocks may be equal to the number of payload blocks. Each of said number of cipher blocks may be the same size as a corresponding one of the number of payload blocks. Each cipher block may be used as an additional cipher block for an associated payload block, preferably by re-encrypting the previously encrypted content with an additional application of an encryption method that uses a password oriented algorithm. Each additional cipher block may be used to encrypt all or part of the data contained within the associated payload block. There may be no limit to the number of associated cipher blocks that can be produced through a process of re-encryption. There may be no limit to the number or layers of passwords that can be applied to a payload block, using additional cipher blocks for all or part of the data contained within the payload block. The information stored on one or more storage devices may contain no information about the format or structure of the payload, or cipher blocks. The information stored on one or more storage devices may contain no information about the content of any payload block, or organization of the directory, user information, or free space. The directory information contained within a payload block may contain an unstructured or free format file definition that provides a name for the user information, and points to the payload block, blocks, or chain of blocks, that contains the user data identified. The directory blocks may not be organized into any hierarchical structure. The hierarchical structure, if utilized, may be contained only within the name for the user information. The hierarchical structure of directories and/or subdirectories may be constructed by reading all directory block information into volatile electronic memory.

All payload blocks and cipher blocks stored on one or more storage devices may appear as a block of random numbers. No identification of the usage of the blocks may be determined on the one or more storage devices. No identification of user data, directory information, or free space may be determined on the one or more storage devices. A map of free and available blocks for new and/or replacement blocks may only be constructed by examining all the directory block information available in volatile electronic memory. The payload and cipher blocks may be records, stored within another data file, on one or more storage device of some other file management system.

Figure 5:
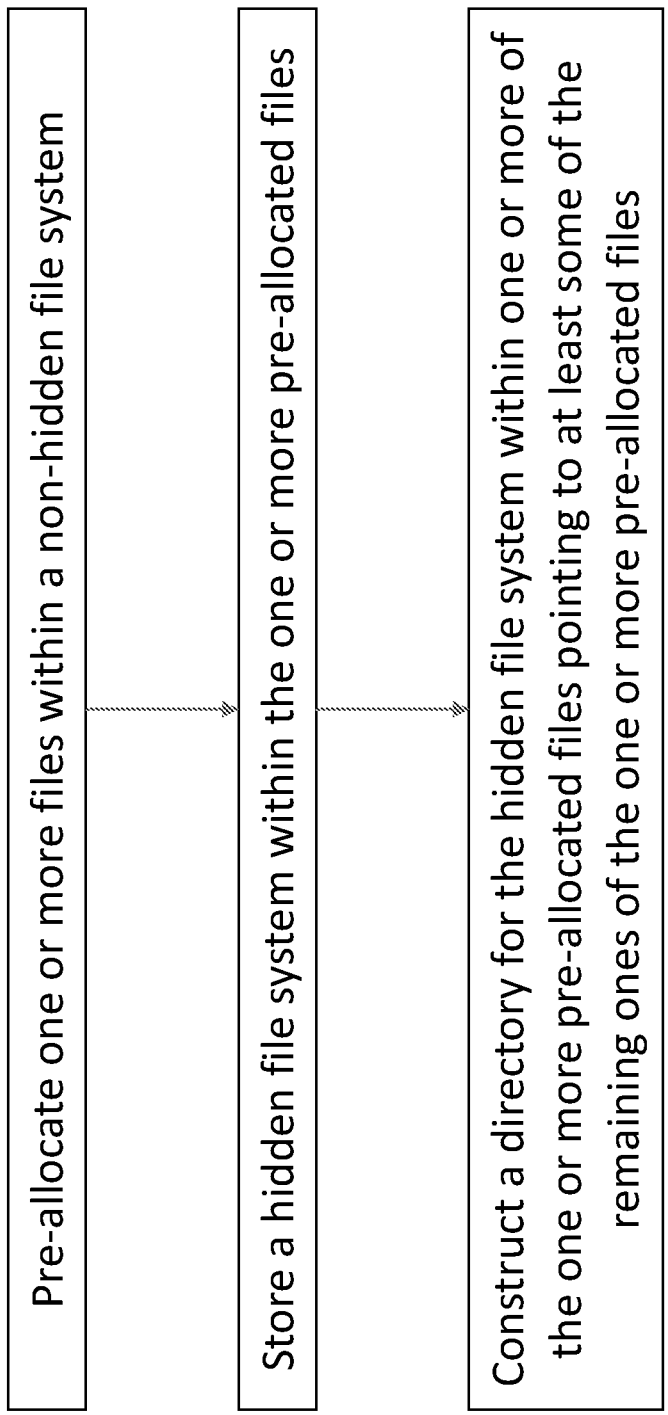
FIG. 5 illustrates exemplary logic for creating a hidden file system within a non-hidden file system.

FIG. 5 illustrates exemplary logic for creating a hidden file system within a non-hidden file system. To contain a hidden file system within a non-hidden and/or standardized file system, a group of payload blocks may be pre-allocated and contained within a single file or as multiple files within the non-hidden file system. This may allow a large standard file to be contained within a non-hidden system while it internally contains the hidden file system of more complex and/or additional files. In other words, pre-allocated files within a normal, non-hidden file system may be configured to contain an additional, hidden file system. Since the pre-allocated file(s) may be of sufficient size to contain the entire hidden file system, the hidden file system may not use the device directly for block storage, but may use one or more pre-allocated files within the non-hidden file system for such purposes.

Since the hidden file system is fully contained within one or more files of the non-hidden file system or systems, all of the hidden file system's data may remain encrypted and not in use until access is necessary. As file access becomes necessary, the internal structure and directory may be loaded into memory, and the hidden files may be revealed as described above. This may allow the contents of the hidden file system to be secured when not in use, for example without limitation, when power is removed from the system. At no time will the encrypted data be committed to long term storage, and may be only used in volatile memory storage in exemplary embodiments.

Cipher blocks and payload blocks may be provided in equal numbers, though such is not required, but they may be distributed throughout a number of pre-allocated files. Therefore, an operation which reveals the hidden file system may begin by pointing its decryption operation at the file that contains the root or main point for the hidden file system. As the hidden file system decrypts its directory, it is possible for multiple additional pre-allocated files to be located by information contained within the directory of the hidden file system. With this method, it is possible to distribute an entire hidden file system within one or more files of normal, non-hidden file system without observation or location of where and how the system is being used. Furthermore, since the pre-allocated files are identified within the hidden system, it is possible for the pre-allocated files to be reorganized and moved within the non-hidden system that contains the cipher and payload blocks.

The systems and methods shown and described with respect to FIG. 5 may be used in conjunction with the systems and methods shown and described with respect to one or more of FIGS. 1-4. For example, without limitation, at least one of the pre-allocated files may be used as a cipher block 52, 62, at least one other one of the pre-allocated files may be used as a payload block 11, 21, 31, and at least yet one other one of the pre-allocated files may be used as a directory block 71 which points to the other pre-allocated files, such as those comprising cipher blocks 52, 62 and/or payload block 11, 21, 31. However, one or more of the cipher block(s) 52, 62, payload block(s) 11, 21, 31, and/or directory blocks 71 may be located within various single ones of the pre-allocated files.

Any embodiment of the present invention may include any of the features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

Certain operations described herein may be performed by one or more electronic devices. Each electronic device may comprise one or more processors, electronic storage devices, executable software instructions, and the like configured to perform the operations described herein. The electronic devices may be general purpose computers or specialized computing device. The electronic devices may be personal computers, smartphone, tablets, databases, servers, or the like. The electronic connections and transmissions described herein may be accomplished by wired or wireless means.

What is claimed is:

1. A system for creating a hidden electronic file system within a non-hidden electronic file system, said system comprising:
executable software instructions stored on one or more electronic storage devices, which when executed, configures one or more processors to:
pre-allocate one or more files within the non-hidden electronic file system;
populate at least a portion of at least one of said one or more pre-allocated files with a number of payload blocks, a first portion of said number of payload blocks comprising user data to be covertly stored, a second portion of said number of payload blocks comprising directory information pointing to each of the number of payload blocks in the first portion of said number of payload blocks, and a third portion of said number of payload blocks configured for use as free and available space for new or replacement data;
populate at least a portion of at least one of said one or more pre-allocated files with a number of cipher blocks, each comprising random numbers to be used as a cipher for a corresponding one of the number of payload blocks; and
encrypt each of the number of payload blocks with an associated one of the number of cipher blocks.

2. The system of claim 1 wherein:
said one or more pre-allocated files are fixed length data blocks.

3. The system of claim 1 wherein:
each of the number of cipher blocks are encrypted by an encryption method that uses a password oriented algorithm.

4. The system of claim 1 wherein:
said one or more pre-allocated files comprise multiple pre-allocated files, each comprising one of the number of cipher blocks or one of the number of payload blocks.

5. The system of claim 1 wherein:
said one or more pre-allocated files comprise a single pre-allocated file comprising each of the number of cipher blocks and each of one of the number of payload blocks.

6. The system of claim 1 wherein:
said one or more pre-allocated files comprise multiple pre-allocated files, at least one of which comprises more than one of the number of cipher blocks, more than one of the number of payload blocks, or at least one of the number of cipher blocks and at least one of the number of payload blocks.

7. The system of claim 1 wherein:
the number of cipher blocks is equal to the number of payload blocks.

8. The system of claim 7 wherein:
each of said number of cipher blocks are the same size as the associated one of the number of payload blocks.

9. The system of claim 8 wherein:
each of the number of payload blocks is associated with more than one of the number of cipher blocks;
each of the number of payload blocks is encrypted by each associated one of the number of cipher blocks such that each of said number of payload blocks is initially encrypted by a first associated one of the number of cipher blocks and re-encrypted by a second associated one of the number of cipher blocks.

10. The system of claim 9 wherein:
said second associated one of the number of cipher blocks is encrypted by a different encryption method than said first associated one of the number of cipher blocks.

11. The system of claim 10 wherein:
the first associated one of the number of cipher blocks is configured for use to encrypt only a first portion of data contained within the associated one of the number of payload blocks; and
the second associated one of the number of cipher blocks is configured for use to encrypt only a second portion of the data contained within the associated one of the number of payload blocks.

12. The system of claim 10 wherein:
the second associated one of the number of cipher blocks is configured for use to encrypt all data contained within the associated one of the number of payload blocks.

13. The system of claim 8 wherein:
information stored at the one or more pre-allocated files within the non-hidden electronic file system contains no information about a format or structure of the number of payload blocks or of the number of cipher blocks; and
information stored at the one or more pre-allocated files within the non-hidden electronic file system contains no information about content of any of the number of payload blocks, the directory information, user information, or free space.

14. The system of claim 8 wherein:
the directory information comprises an unstructured or free format file definition providing a name for the user information, and comprises pointers to each of the number of payload blocks in the first portion of said number of payload blocks; and
the directory information is not organized into any hierarchical structure.

15. The system of claim 8 wherein:
the directory information comprises a hierarchical structure contained only within the name for the user information;
the directory information comprises pointers to each of the number of payload blocks in the first portion of said number of payload blocks; and
the hierarchical structure of the directory information is capable of construction by reading all directory information into volatile electronic memory.

16. The system of claim 8 wherein:
each of the number of payload blocks and each of the number of cipher blocks stored in the one or more pre-allocated files of the non-hidden electronic file system appear as a block of random numbers;
no identification of the usage of one or more pre-allocated files is determinable on the one or more pre-allocated files of the non-hidden electronic file system that contains the one or more pre-allocated files;
no identification of user data, directory information, or free space is determinable on the one or more pre-allocated files of the non-hidden electronic file system; and
a map of free and available ones of the one or more pre-allocated files for new and/or replacement blocks is determinable only by examination of all the directory information available in volatile electronic memory.

17. A system for creating a hidden electronic file system within a non-hidden electronic file system, said system comprising:

a number of pre-allocated files of fixed length within the non-hidden electronic file system, said number of pre-allocated files comprising:
- a number of payload blocks, a first portion of said number of payload blocks comprising user data to be covertly stored, a second portion of said number of payload blocks comprising directory information pointing to each of the number of payload blocks in the first portion of said number of payload blocks, and a third portion of said number of payload blocks configured for use as free and available space for new or replacement data; and
- a number of cipher blocks, each comprising random numbers to be used as a cipher for a corresponding one of the number of payload blocks;
- wherein each of the number of payload blocks is encrypted by at least one associated one of the number of cipher blocks;
- wherein each of said number of cipher blocks is encrypted by encryption method that uses a password oriented algorithm.

18. A method for creating a hidden electronic file system within a non-hidden electronic file system, said method comprising the steps of:
- allocating one or more files within the non-hidden electronic file system for use as part of the hidden file system;
- populating some of the one or more files with a number of payload blocks, wherein a first portion of said number of payload blocks comprise user data to be covertly stored, a second portion of said number of payload blocks comprise directory information pointing to each of the number of payload blocks in the first portion of said number of payload blocks, and a third portion of said number of payload blocks are configured for use as free and available space for new or replacement data; and
- populating some of the one or more files with a number of cipher blocks, each comprising random numbers to be used as a cipher for a corresponding one of the number of payload blocks; and
- encrypting each of the number of payload blocks with an associated one of the number of cipher blocks.

19. The method of claim 18 wherein:
said series of pre-allocated files are fixed length data blocks; and
each of the number of cipher blocks are encrypted by an encryption method that uses a password oriented algorithm.

20. The method of claim 18 wherein:
each of said one or more files comprises one of said number of payload blocks or one of said number of cipher blocks.

* * * * *